United States Patent
Hickman et al.

[11] 3,827,485
[45] Aug. 6, 1974

[54] HEAT EXCHANGER AND METHOD OF MANUFACTURE THEREFOR

[75] Inventors: Stephen L. Hickman; Carl O. Griewahn, both of Adrian, Mich.

[73] Assignee: Brazeway, Inc., Adrian, Mich.

[22] Filed: Mar. 23, 1973

[21] Appl. No.: 344,245

[52] U.S. Cl............... 165/171, 29/157.3 C, 62/515, 113/118 C, 165/49
[51] Int. Cl............................................. F28f 1/32
[58] Field of Search............ 29/157.3 C; 113/118 C; 165/171, 49; 62/515

[56] References Cited
UNITED STATES PATENTS

| | | | |
|---|---|---|---|
| 2,077,410 | 4/1937 | Harter et al. | 165/171 X |
| 2,171,790 | 9/1939 | Higham | 165/171 X |
| 2,516,586 | 7/1950 | Peltier | 62/515 X |
| 2,734,259 | 2/1956 | Beck | 29/157.3 C |
| 2,867,417 | 1/1959 | Axlander | 165/171 X |

*Primary Examiner*—Charles W. Lanham
*Assistant Examiner*—D. C. Reiley, III

[57] ABSTRACT

A heat exchange apparatus comprising a tube and plate and a method of manufacture for the heat exchange apparatus. The method includes the steps of forming the tube, such as by extrusion, to provide an external attachment appendage which, in the illustrative embodiment, is T-shaped in cross section, forming spaced parallel slots in a thin plate, offsetting the material of the plate along and adjacent the slots to accommodate the T-shaped attachment appendage in sliding relationship therewith and, finally, compressing the tube against the plate to lock the two elements together and to provide a flush surface on the side of the plate which is opposite the tube.

9 Claims, 4 Drawing Figures

PATENTED AUG 6 1974  3,827,485

HEAT EXCHANGER AND METHOD OF MANUFACTURE THEREFOR

INTRODUCTION

This invention relates to heat exchanger apparatus and to a method of manufacture for heat exchanger apparatus which involves the assembly of a tube and plate for thermal transfer therebetween.

BACKGROUND OF THE INVENTION

Heat exchanger apparatus for use as condensers, evaporators, radiators and the like typically comprise the combination of a fluid conduit of serpentine configuration and one or more fins or plates which enlarge the effective surface area of the conduit for efficient thermal exchange. The manufacture of such heat exchange apparatus typically comprises the steps of forming a tube or other conduit means and joining it to the plate by an operation such as brazing, epoxy bonding, or "roll-bonding".

The brazing, epoxy bonding, and/or "roll-bonding" processes are relatively expensive in themselves as compared to mechanical bonding techniques and, moreover, typically require the use of capital equipment which adds still further expense to this process. Therefore, although the products which result from the brazing, epoxy bonding, and/or "roll-bonding" operations are satisfactory, there exists a need for a simple and economical method of heat exchanger fabrication which involves a purely mechanical bonding process.

BRIEF SUMMARY OF THE INVENTION

This invention provides a simple and economical method of fabricating heat exchanger apparatus through the mechanical bonding of a tube and a plate for efficient thermal transfer therebetween. Briefly stated, the method involves the fabrication of a tube having an external attachment appendage and the formation of one or more slots in a plate so as to receive the attachment appendage. Either before or after the slot and attachment appendage are interconnected, the material of the plate is offset along and adjacent the slot by at least the thickness of the attachment appendage such that when the appendage is disposed in the slot and in the offset portion, a substantially flush surface is provided on the side of the plate which is opposite the tube. In the preferred embodiment of the present invention, the final bond is achieved by compressing the tube against the plate thereby to partially flatten the tube into good thermal transfer configuration while at the same time tightening the mechanical bond and smoothing the flush side of the plate.

In the illustrative embodiment of the invention hereinafter described in detail, the tube is preferably of extruded aluminum and has an integral, T-shaped (in cross section) attachment appendage. The manufacturing operation as illustratively described involves the formation of a plurality of spaced, parallel slots in the plate and the prior bending of the tubes so as to form straight portions which register with the slots in the plate. The attachment appendage is trimmed from the tube along the curved portions between the straight portions whereupon the tube may be simply inserted by sliding the attachment appendages into the offsets and slots. As stated above, this joining operation is followed by a compression step which results in an inexpensively fabricated yet highly durable and efficient heat exchange device.

DETAILED DESCRIPTION OF THE SPECIFIC EMBODIMENT

Figure 1:
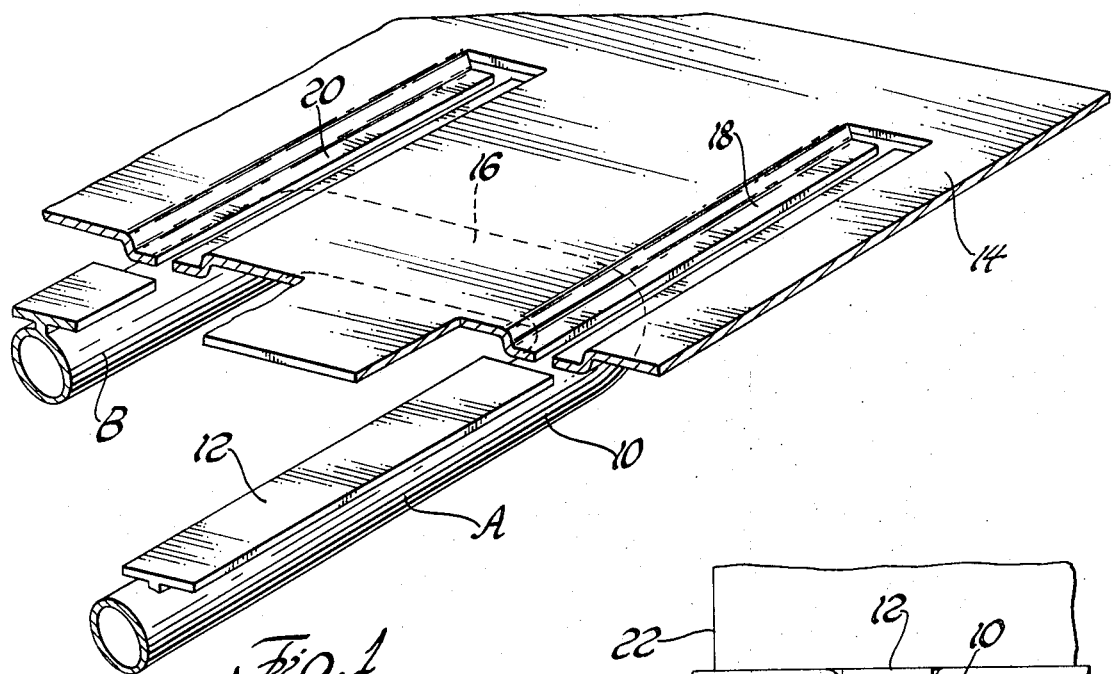
FIG. 1 is an isometric view with parts broken away of an illustrative tube and plate apparatus for carrying out the invention.

Referring now to the drawings and particularly to FIG. 1, there is shown an apparatus for the assembly of a heat exchange device which, in accordance with the present invention, comprises an extruded aluminum tube 10 suitable for the conveyance of various fluids and having an external attachment appendage 12 which is integral with the tube and T-shaped in cross section. FIG. 1 also illustrates a plate 14 of aluminum or other suitable thermally conductive material, the plate 14 being subjected to a number of industrial processing steps so as to receive the tube 10 into a cooperative relationship therewith as hereinafter described. In that cooperative relationship an efficient thermal transfer relationship between the tube 10 and the plate 14 exists.

As shown in FIG. 1, tube 10 is formed with the integral T-shaped attachment appendage 12 and is then bent to define a curved portion 16 separating two parallel straight portions A and B. The external attachment appendage 12 is then trimmed from the tube 10 along the entire length of the curved portion 16, but is left intact along the straight portions A and B.

Figure 2:
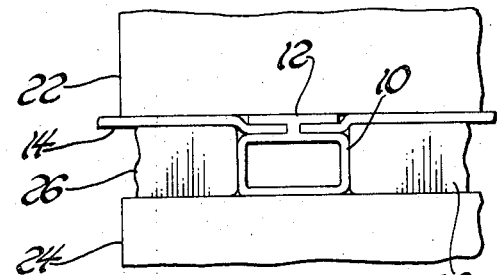
FIG. 2 is an end view of a portion of the tube and plate illustrated in FIG. 1 and showing the result of the compression step.

The tube 10 shown in FIGS. 1 and 2 is extruded aluminum having an outer diameter of 0.312 inches and a wall thickness of approximately 0.035 inches and a spacing between the straight portions A and B of from 1 inch to several inches. These dimensions are, of course, given by way of illustration only as they bear no critical relationship to the invention whatsoever. The curved portion 16 may be formed in accordance with the configuration shown in the drawings or, alternatively, may be formed as a continuous radius.

Looking now to the plate 14, this member is also preferably formed of aluminum in a suitable thickness so as to be susceptible of the forming operations described herein. Slots 18 and 20 are formed within the interior boundaries of the plate in parallel relationship and spaced apart so as to register with and be of equivalent length to the lengths of the attachment appendage 12 along the straight portions A and B of tube 10. The material of the plate 14 along and adjacent the slots 18 and 20 is then offset, as shown in FIG. 1, by an amount at least equal to and preferably twice the thickness of the top of the T-shaped appendage 12. The greater offset distance is generally required where the slots 18 and 20 do not open to a border or edge of the plate 14 whereas a lesser offset distance is satisfactory where the slots do open to an edge of the plate for obvious reasons. It will be noted that the device of FIG. 3 illustrates the case where the slots have terminal ends spaced from the boundaries of the plate 14.

Tube 10 and plate 14 are then interconnected by lining up the attachment appendage lengths with the slots and sliding the appendage lengths into the slots so as to fill the slots and offset areas of the plate 14. At this state in the assembly process, the tube 10 is relatively loosely connected to the plate 14 but is essentially in the final position.

Looking to FIG. 2, the assembly of the tube 10 and plate 14 is then subjected to a compression step wherein opposite platens 22 and 24 of an hydraulic press or the like are brought to bear against the top of the plate 14 and the bottom of the tube 10 so as to compress the tube against the plate within the boundaries of spacer blocks 26 thereby locking the assembly together and bringing all abutting surfaces into close contact to improve the thermal conductivity. In addition, the offset area is compressed along with the T-shaped appendage 12 so as to form a substantially flush surface on the side of the plate 14 which is opposite the tube 10. Obviously, a compression roller arrangement may be substituted for the platens 22 and 24 shown in FIG. 2. Also a die may be substituted for the platen 24 and blocks 26 in a production machine.

Figure 3:
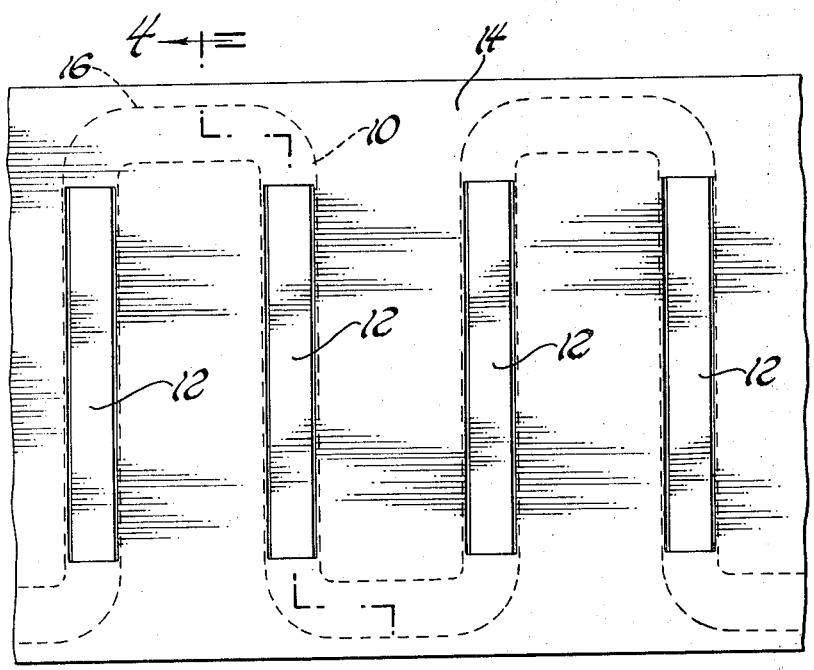
FIG. 3 is a plan view of a representative portion of a finalized product manufactured in accordance with the invention; and, FIG. 4 is a side view or sectional view along the section line 4—4 of FIG. 3.
Figure 4:
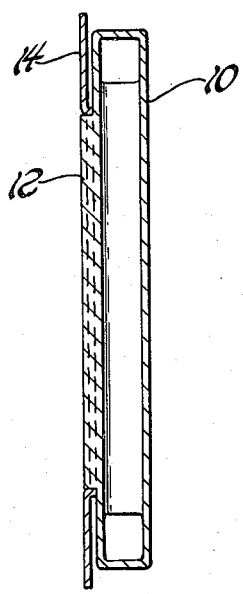

As best shown in FIGS. 3 and 4, the tube 10 is typically formed in a serpentine configuration so as to be characterized by a plurality of parallel, spaced, straight portions joined by a plurality of curved portions, the T-shaped attachment appendage 12 being trimmed from the tube 10 throughout the length of the curved portions, but left intact throughout the parallel spaced straight portions. The terminal ends of the tube 10 may, of course, occur at various points along the length thereof in accordance with the specific application of the heat exchange device manufactured hereunder.

It will be understood that the attachment appendage may be of various configurations including not only the T-shaped configuration shown in the drawings but also, for example, an L-shape. The appendage is not necessarily extruded in its final form, but may be bent or folded during the compression step according to the specific shape thereof. The flush surface evident in FIGS. 2 through 4 may be accomplished by forming the offset after assembly of the tube 10 and plate 14 rather than before assembly as described above. In accordance with this alternative, the slots 18 and 20 may be cut into the plate 14 so as to extend fully to the edge of the sheet. The appendage 12 is then disposed in the slot and the combination is compressed in a platen and die combination similar to that of FIG. 2 wherein the upper platen 22 is flat and the lower platen or die maintains the assembly shape by confinement. The compression step displaces the appendage 12 downwardly so as to cold-form the offset during the compression and shaping of the assembly. The result is a flush upper surface of the assembly and a secure bond between tube and plate.

It is to be understood that the flush surface of the combined plate 14 and tube 10 is desirable inasmuch as the heat exchange device is often left exposed on the flush side in the final assembly, such as in a refrigerator, cooler, freezer, or the like. However, the major advantages of the invention arise from the economical and effective securement of parts together and these advantages obtain even where the resulting surface is not perfectly flat. Accordingly, the full offset of the appendage area of the plate is not essential to the invention. The heat exchange apparatus is typically coated by spraying or dipping with a suitable preservative material, such as an acrylic plastic, to meet Underwriters Laboratory and other requirements. Such dipping or spray coating tends to fill the small cracks or voids which exist between the top of the T-shaped appendage 12 and the adjacent plate areas, as best shown in FIG. 2, thus, to make the final assembly easy to clean as well as attractive in appearance.

The invention has, of course, been described by reference to an illustrative embodiment and, accordingly, the foregoing specification is not to be construed in a limiting sense.

The embodiments of the invention in which an exclusive property or privilege is claimed are defined as follows:

1. A method for assembling a tube and a plate for thermal transfer therebetween wherein the tube has formed integrally therewith an external attachment appendage, the method comprising the steps of: forming at least one slot in and through the plate, joining the appendage and slot forming an offset in the plate along and adjacent the slot, said offset being of appropriate configuration to receive said appendage, and compressing the tube against the plate to provide a mechanical bond between the tube and plate and a substantially flush surface on the side of the plate opposite the tube.

2. The method defined in claim 1 including the step of forming the offset in the plate along and adjacent the slot before joining the appendage and slot, the slot and offset being substantially straight and corresponding in length to a straight segment of said tube.

3. A method as defined in claim 2 wherein said attachment appendage comprises a radial leg and a flat top leg, the top leg being disposed in said offset so as to form part of said flush surface after the compression step has been carried out.

4. A method for assembling a tube having an external attachment appendage and a plate for thermal transfer between the tube and plate comprising the steps of extruding a metal tube having an integral attachment appendage along one side thereof, forming at least one slot in and through the plate, sliding the appendage into the slot, and compressing the tube against the plate to mechanically bond the plate and tube and to form an offset in said plate along and adjacent said slot which receives said appendage so that a substantially flush surface is provided on the side of the plate opposite the tube.

5. The method defined in claim 4 including the further step of bending the tube to form a curved tube portion and a straight tube portion and trimming the attachment appendage from the tube along the curved portion, the straight portion corresponding in length to the length of the slot.

6. The method defined in claim 4 wherein the slot has a pair of terminal ends which are spaced from and within the boundaries of the plate.

7. A method for assembling a tube having an external attachment appendage and a plate for thermal transfer between the tube and plate comprising the steps of: extruding a metallic tube having an integral T-shaped attachment appendage, bending the tube into a serpentine configuration having a plurality of curved portions and a plurality of parallel straight portions, trimming the external attachment appendage from the curved portions, forming a plurality of parallel slots in and through a metallic plate of such length and spacing as to correspond to the length and spacing of the straight portions of the tube, offsetting the plate along and adjacent to the slots by at least the thickness of the T-shaped attachment appendage, sliding the attachment appendage segments into the spaced slots and offset portions and compressing the tube against the plate with the plate between the tube and appendage top to provide a mechanical connection between the tube and plate and to further provide a substantially flush surface on the side of the plate opposite the tube.

8. A heat exchanger apparatus comprising: a tube having an integral attachment appendage, a plate having a through slot formed therein, and an offset along and adjacent the slot, said attachment appendage being disposed in said slot and offset and of such configuration as to provide a substantially flush surface on the side of the plate opposite the tube, the tube being compressed against the plate.

9. A heat exchanger apparatus as defined in claim 8 wherein said tube includes at least one curve portion and at least one straight portion, the attachment appendage being disposed only along said straight portion.

* * * * *